(12) United States Patent
Chen et al.

(10) Patent No.: US 7,937,483 B2
(45) Date of Patent: May 3, 2011

(54) SYSTEM AND METHOD OF ROUTING DATA PACKETS USING TRUNK PORTS AND ACCESS PORTS

(75) Inventors: Wenge Chen, Austin, TX (US); Yetik Serbest, Austin, TX (US); Stephanie Karasick, Austin, TX (US); Eric Puetz, Georgetown, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1409 days.

(21) Appl. No.: 11/290,632

(22) Filed: Nov. 30, 2005

(65) Prior Publication Data

US 2007/0121588 A1     May 31, 2007

(51) Int. Cl.
    *G06F 13/00*     (2006.01)
(52) U.S. Cl. ........................................................ 709/230
(58) Field of Classification Search .................... 709/230
    See application file for complete search history.

(56) References Cited

U.S. PATENT DOCUMENTS

| | | | |
|---|---|---|---|
| 6,633,563 B1 * | 10/2003 | Lin et al. | 370/389 |
| 6,785,286 B1 | 8/2004 | O'Keeffe et al. | |
| 6,950,430 B2 | 9/2005 | Kalkunte et al. | |
| 2004/0170176 A1 | 9/2004 | Kadambi et al. | |

OTHER PUBLICATIONS

"Crossbar Switch" from Wikipedia, the Free Encyclopedia, http://en.wikipedia.org/wiki/Crossbar, printed Nov. 2, 2005, 3 pp.
"Serial Communications" from Wikipedia, the Free Encyclopedia, http://en.wikipedia.org/wiki/Serial_communications, printed Nov. 2, 2005, 3 pp.
"ATM Switch Line Card" Freescale Semiconductor, 2004, 4 pp.
"Switch Fabric Data Sheet for 89TSF500" Integrated Device Technology, Inc., 2005, 37 pp.

* cited by examiner

*Primary Examiner* — Robert B Harrell
(74) *Attorney, Agent, or Firm* — Toler Law Group

(57) ABSTRACT

A system and method of routing data packets is disclosed. In a particular embodiment, the method includes receiving a first Internet Protocol (IP) data packet at a first access port of an access line card within a data router. The method also includes transmitting the first IP data packet from the first access port to a network line card within the data router, via a first trunk port of the access line card. The first access port is coupled to the first trunk port and not coupled to at least one other access port. The method further includes receiving a second IP data packet at a second trunk port of the access line card from the network line card. In addition, the method includes transmitting the second IP data packet from the second trunk port to a second access port of the access line card.

28 Claims, 6 Drawing Sheets

SYSTEM AND METHOD OF ROUTING DATA PACKETS USING TRUNK PORTS AND ACCESS PORTS

FIELD OF THE DISCLOSURE

The present disclosure is generally related to routing data packets.

BACKGROUND

Television and films provide sources of information and entertainment to many viewers. Content providers offer a large number of channels that allow viewers to select from a wide variety of programming. Television and film content can be delivered through a variety of systems, such as broadcast networks, cable networks, and data networks. Cable networks and data networks allow providers to offer more channels than broadcast networks, because they are less dependent upon broadcast frequencies.

Transmitting video content to viewers over data networks can require a large volume of complex routing hardware. Many high-speed switches use full mesh switching architectures, meaning that any port on any line card can be switched to any other port on any other line card. The number of high-speed links, as well as the queuing and memory hardware necessary to implement such switches can be vast and expensive, particularly when serving a metropolitan area or other market. Accordingly, there is a need for an improved system and method of routing data packets.

DETAILED DESCRIPTION OF THE DRAWINGS

Figure 1:
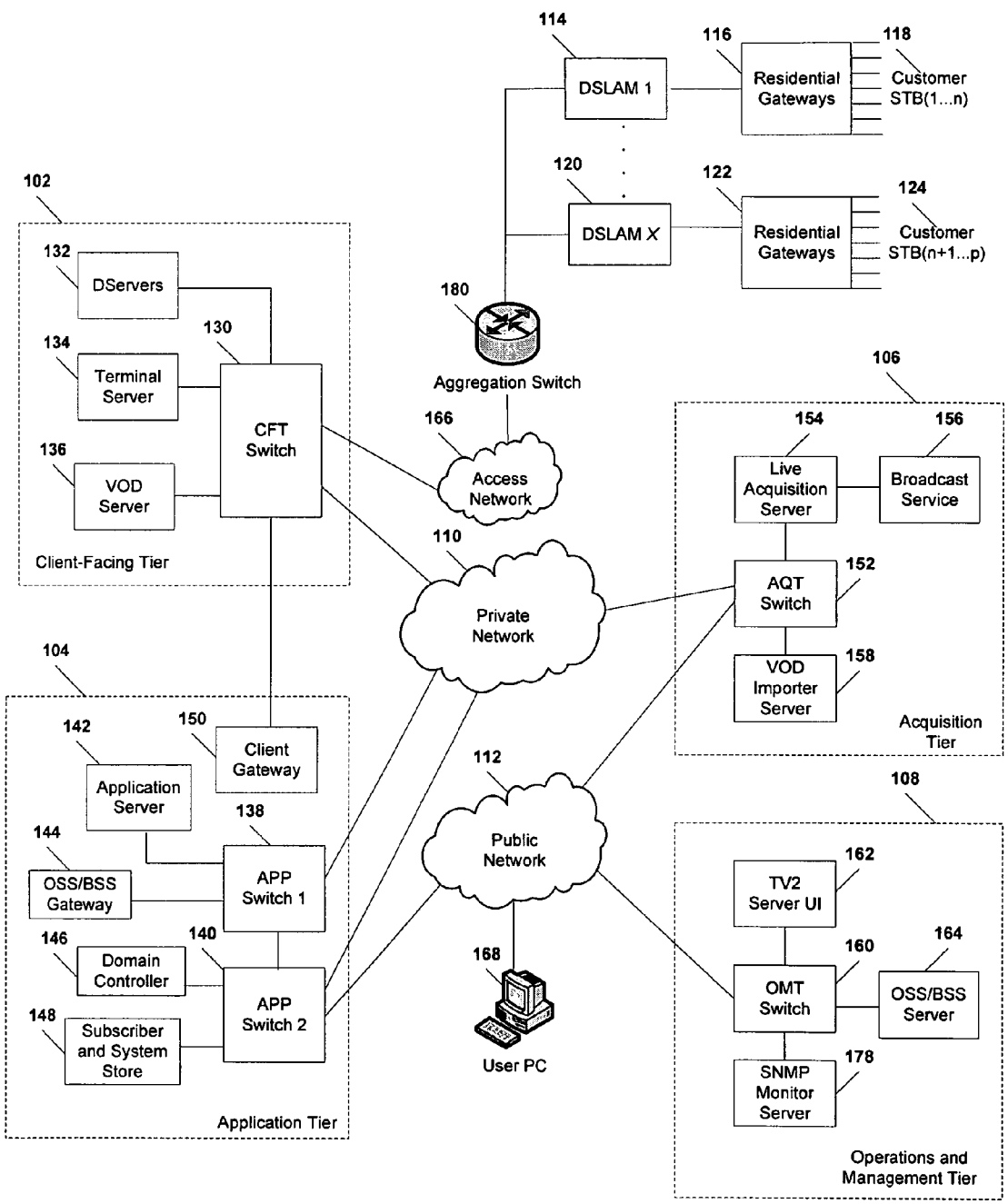
FIG. 1 is a block diagram illustrating an embodiment of an Internet Protocol Television (IPTV) system.

A system and method of routing data packets is disclosed. In a particular embodiment, an access line card within a data router is disclosed and includes a first plurality of access ports, a second plurality of access ports, a first plurality of trunk ports, and a second plurality of trunk ports. Each of the first plurality of access ports is configured to communicate with the first plurality of trunk ports, but not to communicate with any other of the first plurality of access ports or with any of the second plurality of access ports. Each of the second plurality of access ports is configured to communicate with the second plurality of trunk ports, but not to communicate with any other of the second plurality of access ports or with any of the first plurality of access ports. Additionally, the first plurality of trunk ports and the second plurality of trunk ports are configured to communicate with at least one network line card.

In another embodiment, an access line card within a data router is disclosed and includes a first plurality of access ports, a second plurality of access ports, a first trunk port, and a second trunk port. Each of the first plurality of access ports is configured to communicate with the first trunk port, but not to communicate with any other of the first plurality of access ports or with any of the second plurality of access ports. Each of the second plurality of access ports is configured to communicate with the second trunk port, but not to communicate with any other of the second plurality of access ports or with any of the first plurality of access ports. The first trunk port and the second trunk port are configured to communicate with a network line card.

In another embodiment, a data router is disclosed having a first access line card and a second access line card.

In another embodiment, a method of routing data packets is disclosed and includes receiving a first Internet Protocol (IP) data packet at a first access port of an access line card within a data router. The method also includes transmitting the first IP data packet from the first access port to a network line card within the data router, via a first trunk port of the access line card. The first access port is coupled to the first trunk port and not coupled to at least one other access port. The method further includes receiving a second IP data packet at a second trunk port of the access line card from the network line card. In addition, the method includes transmitting the second IP data packet from the second trunk port to a second access port of the access line card.

In another embodiment, a method of sending and receiving data packets of an Internet Protocol Television (IPTV) system is disclosed and includes transmitting a first Internet Protocol (IP) data packet to an access line card of an IP data router. A first access port of the access line card communicates the first IP data packet to a network line card within the IP data router, via a first trunk port of the access line card. The first access port is coupled to the first trunk port but not coupled to at least one other access port. The method also includes receiving a second IP data packet from the access line card.

In another embodiment, a computer program embedded in a computer-readable media is disclosed and includes instructions to route a first Internet Protocol (IP) data packet received at one of a plurality of first access ports of an access line card of an IP data router, to a network line card within the IP data router, via one of a plurality of first trunk ports of the access line card, where each of the plurality of first access ports is configured to communicate with each of the plurality of first trunk ports and to not communicate with any other access port. The computer program also includes instructions to route a second IP data packet received at one of a plurality of second trunk ports of the access line card, from the network line card, to one of a plurality of second access ports of the access line card.

Referring to FIG. 1, an illustrative embodiment of an Internet Protocol Television (IPTV) system that may be used to provide video content by sending and receiving data packets is illustrated and is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

As illustrated in FIG. 1, the client-facing tier 102 can communicate with user equipment via a private access network 166, such as an Internet Protocol Television (IPTV) access network. In an illustrative embodiment, the client-facing tier 102 can communicate with multiple network devices, such as a first representative digital subscriber line access multiplexer (DSLAM 1) 114 through a last representative digital subscriber line access multiplexer (DSLAM X) 120 via the aggregation switch 180. Representative embodiments of the aggregation switch 180 are described further with reference to FIGS. 2-3. Each DSLAM can communicate with one or more residential gateways 116, 122. Further, the residential gateways 116, 122 are each coupled to multiple customer set-top box devices 118, 124. The client-facing tier 102 can communicate with a large number of set-top boxes, such as the customer set-top boxes 118, 124, over a wide geographic area, such as a regional area, a metropolitan area, a viewing area, or any other suitable geographic area that can be supported by networking the client-facing tier 102 to numerous set-top box devices.

In one embodiment, the IPTV system 100 can include a fiber to the neighborhood (FTTN) architecture, such that the client-facing tier 102, DSLAMs 114, 120, and the residential gateways 116, 122 communicate via fiber optic cables, and the residential gateways 116, 122 communicate with the set-top box devices 118, 124 via twisted pairs. Alternatively, a fiber to the curb system can be used, in which the residential gateways 116, 122 can be coupled to customer premises equipment (CPE), such as a DSL modem, a router, or a local area network, via fiber optic cables. Further, each CPE can be coupled to a set-top box device 118, 124. Each set-top box device 118, 124 can process data received via the private access network 166, via an IPTV software platform, such as Microsoft® TV IPTV Edition. Each set-top box device 118, 124 can be coupled to an external display device, such as a television monitor, and can communicate with a remote control device.

In an exemplary, non-limiting embodiment, each set-top box device 118, 124 can receive audio, data, video, or a combination thereof, from the client-facing tier 102 via the private access network 166. The set-top box 118, 124 can output the audio, display the data, or transmit the video to an external display device. Further, the set-top box devices 118, 124 can also communicate commands received from remote control devices back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers or D-servers 132 that store, format and encode video content transmitted from the IPTV system 100 to the set-top box devices 118, 124, in response to user requests, such as television or video-on-demand material. The CFT switch 130 can also be coupled to a terminal server 134 that provides terminal devices with a common connection point to the private network 110. In a particular embodiment, the CFT switch 130 can also be coupled to a video-on-demand (VOD) server 136.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. In a particular embodiment, the application server 142 can provide applications to the set-top box devices 118, 124 via the private access network 166, which enable the set-top box devices 118, 124 to provide functions, such as display, messaging, processing of IPTV data and VOD material, etc. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

Further, the second APP switch 140 can be coupled to a domain controller 146 that provides web access, for example, to users via the public network 112. For example, the domain controller 146 can provide remote web access to IPTV account information via the public network 112, which users can access using their personal computers 168. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly with the client-facing tier 102. In this embodiment, the client gateway 150 can be coupled directly to the CFT switch 130. The client gateway 150 can provide or restrict access to the private network 110 and the tiers coupled thereto.

In a particular embodiment, the set-top box devices 118, 124 can access the IPTV system 100 via the private access network 166, using information received from the client gateway 150. In this embodiment, the private access network 166 can provide security for the private network 110. User devices can access the client gateway 150 via the private access network 166, and the client gateway 150 can allow such devices to access the private network 110 when the devices are authenticated or verified. Similarly, the client gateway 150 can prevent unauthorized devices, such as hacker computers or stolen set-top box devices from accessing the private network 110, by denying access to these devices beyond the private access network 166.

For example, when a set-top box device accesses the system 100 via the private access network 166, the client gateway 150 can verify subscriber information by communicating with the subscriber and system store 148 via the private network 110, the first APP switch 138, and the second APP switch 140. Further, the client gateway 150 can verify billing information and status by communicating with the OSS/BSS gateway 144 via the private network 110 and the first APP switch 138. In one embodiment, the OSS/BSS gateway 144 can transmit a query via the first APP switch 138, to the second APP switch 140, and the second APP switch 140 can communicate the query via the public network 112 to the OSS/BSS server 164. After the client gateway 150 confirms subscriber and/or billing information, the client gateway 150 can allow the set-top box device to access IPTV content and VOD content. If the client gateway 150 cannot verify subscriber information for the set-top box device, e.g., because it is connected to an unauthorized twisted pair, the client gateway 150 can block transmissions to and from the set-top box device beyond the private access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television or movie content, for example, from a broadcast service 156. In a particular embodiment, the live acquisition server 154 can transmit the television or movie content to the AQT switch 152, and the AQT switch 152 can transmit the television or movie content to the CFT switch 130 via the private network 110.

Further, the television or movie content can be transmitted to the D-servers 132, where it can be encoded, formatted, stored, replicated, or otherwise manipulated or prepared for communication from the IPTV system 100 to the set-top box devices 118, 124. The CFT switch 130 can communicate the television or movie content to the DSLAMs 114, 120 via the private access network 166. The set-top box devices 118, 124 can receive the television or movie content via the residential gateways 116, 122. In an illustrative embodiment, video or audio portions of the television or movie content can be streamed to the set-top box devices 118, 124.

Further, the AQT switch 152 can be coupled to a video-on-demand importer server 158 that stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 118, 124, the requests can be transmitted over the private access network 166 to the VOD server 136, via the CFT switch 130. Upon receiving such requests, the VOD server 136 can retrieve the requested VOD content and transmit the content to the set-top box devices 118, 124 across the private access network 166, via the CFT switch 130.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 170 that monitors network devices within or coupled to the IPTV system 100. In a particular embodiment, the OMT switch 160 can communicate with the AQT switch 152 via the public network 112.

In an illustrative embodiment, the live acquisition server 154 can transmit the television or movie content to the AQT switch 152, and the AQT switch 152, in turn, can transmit the television or movie content to the OMT switch 160 via the public network 112. In this embodiment, the OMT switch 160 can transmit the television or movie content to the TV2 server 162 for display to users accessing the user interface at the TV2 server 162. For example, a user can access the TV2 server 162 using a personal computer (PC) 168 coupled to the public network 112.

In a particular embodiment, the aggregation switch 180 can be an Internet Protocol (IP) data router that has a plurality of access line cards coupled to one or more network line cards. IP data packets can be received from the DSLAMs 114, 120 at one or more external interface(s) of the access line card. Each data packet is directed from the external interface(s) to a first plurality of access ports, each of which communicates with a first plurality of trunk ports and does not communicate with any other access port. Each of the first plurality of trunk ports is coupled to a network line card at the aggregation switch 180 via a high-speed serial link. In one embodiment, each of the first plurality of trunk ports can be coupled to a separate network line card.

In a particular embodiment, each network line card of the aggregation switch 180 can communicate with the private access network 166. For instance, each network line card can communicate with components of the IPTV system 100 that have certain IP or MAC addresses. Data packets having an IP or MAC address with which a first network line card communicates can be directed from the first plurality of access ports to the first network line card via a first trunk port. Data packets having an IP or MAC address with which a second network line card communicates can be directed from the first plurality of access ports to the second network line card via a second trunk port that. The data packets can be transmitted from the network line cards at the aggregation switch 180 to their destination devices at the IPTV system 100 via the private access network 166.

In a particular embodiment, an access line card can include a second plurality of access ports, each of which communicate with a second plurality of trunk ports. Additionally, each of the second plurality of trunk ports can be coupled to one of the network line cards via a high-speed serial link. The network line cards can receive data packets from the private access network 166 and can transmit the data packets to the second plurality of trunk ports. The data packets can be directed from the second plurality of trunk ports to the second plurality of access ports. Further, the data packets can be directed from the second plurality of access ports to the DSLAMs 114, 120, via the external interfaces of the access line card, based on a destination IP or MAC address of the data packets, such as the IP addresses of the customer set-top box device, 118, 124.

Figure 2:
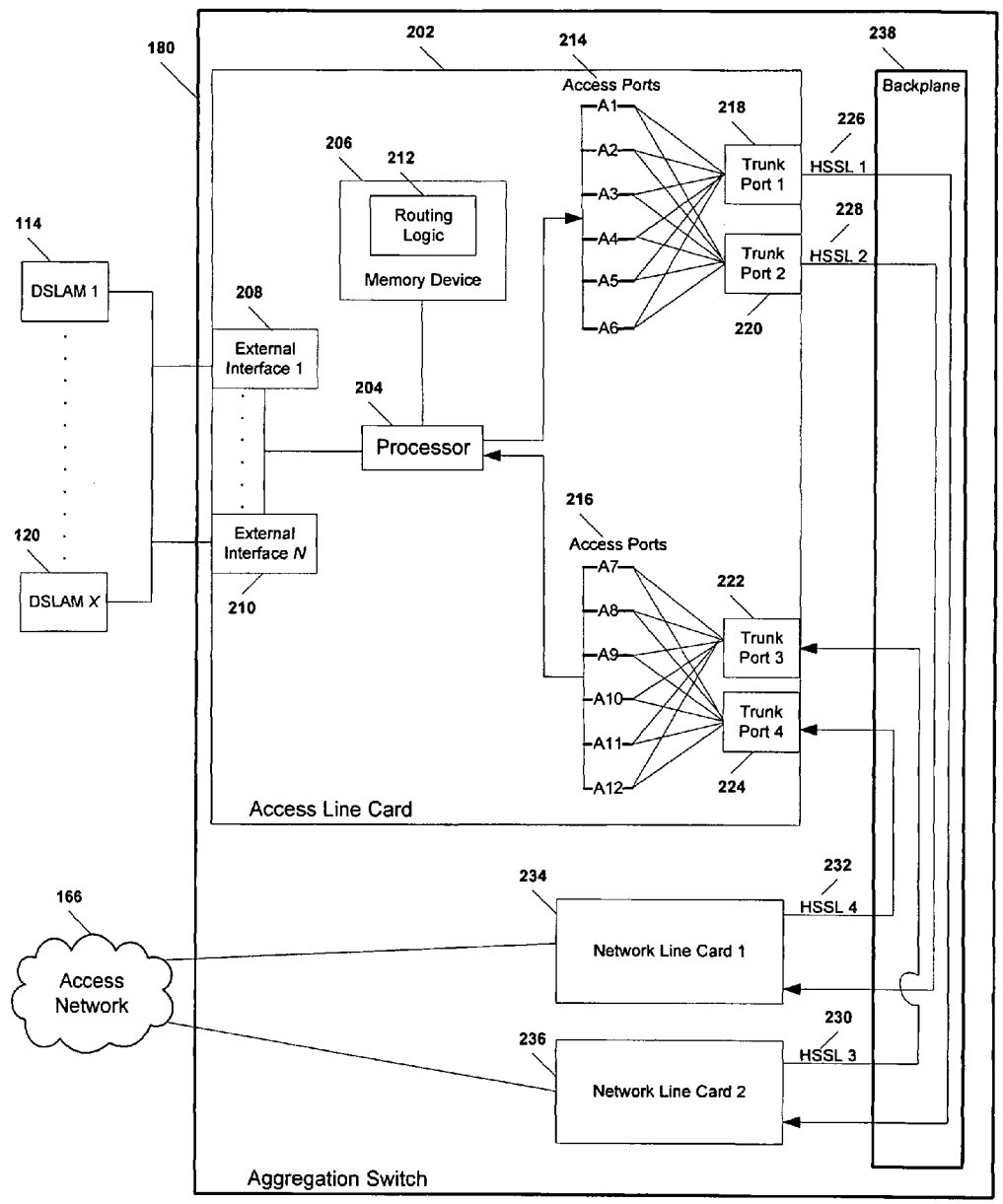
FIG. 2 is a block diagram illustrating an embodiment of an aggregation switch.

Referring to FIG. 2, a particular embodiment of a system to route data packets is illustrated and designated generally 200. In a particular embodiment, the system 200 includes the aggregation switch 180 illustrated in FIG. 1, which may be a layer two switch. The aggregation switch 180 can include an access line card 202 having a processor 204 and a memory device 206 that is accessible to the processor 204. Additionally, the processor 204 is coupled to one or more external interfaces, such as external interface 1 208 and external interface N 210. The processor 204 also communicates with a first plurality of access ports 214 and a second plurality of access ports 216. In an illustrative embodiment, the first plurality of access ports 214 and the second plurality of access ports 216 can be virtual ports within the processor 204 or the memory device 206.

The first plurality of access ports 214 communicates with a first plurality of trunk ports, such as trunk port 1 218 and trunk port 2 220. Each of the first plurality of access ports 214 communicates with trunk ports 218, 220 but does not communicate with any other of the first plurality of access ports 214 or any of the second plurality of access ports 216. Additionally, each of the second plurality of access ports 216 communicates with a second plurality of trunk ports, such as trunk port 3 222 and trunk port 4 224. Each of the second plurality of access ports 216 communicates with trunk ports 222, 224 but does not communicate with any of the first plurality of access ports 214 or any other of the second plurality of access ports 216.

As illustrated in FIG. 2, each trunk port 218-224 is coupled to one or more network line cards 234, 236 via a high-speed serial link. For example, trunk port 1 218 can be coupled to a second network line card 236 via a first high-speed serial link (HSSL 1) 226. Trunk port 2 220 can be coupled to a first network line card 234 via a second high-speed serial link (HSSL 2) 228. Additionally, trunk port 3 222 can be coupled to the second network line card 236 via a third high-speed serial link (HSSL 3) 230. Further, trunk port 4 224 can be coupled to the first network line card 234 via a fourth high-speed serial link (HSSL 4) 232. The high-speed serial links 226-232 can be coupled to the trunk ports 218-224 and to the network line cards 234, 236, via a backplane 238 of the aggregation switch 180.

In a particular embodiment, the external interface(s) 208, 210 of the access line card 202 can communicate with one or more digital subscriber line access multiplexers (DSLAM), such as the DSLAM 1 114 through DSLAM X 120, illustrated in FIG. 1. The DSLAMs 114, 120 can communicate with Internet Protocol Television (IPTV) subscriber equipment via one or more residential gateways. For example, the access line card 202 can send data packets that include video content data to IPTV subscriber set-top box devices via the DSLAMs 114, 120, and can receive data packets corresponding to commands or requests from the IPTV subscriber set-top box devices via the DSLAMs 114, 120.

In an illustrative embodiment, the network line cards 234, 236 can communicate with one or more devices of an IPTV system via a private access network, such as the private access network 166 illustrated in FIG. 1. For example, the first network line card 234 can communicate with devices having one or more first Internet Protocol (IP) or Media Access Control (MAC) addresses via the private access network 166, and the second network line card 236 can communicate with devices having one or more second Internet Protocol (IP) or Media Access Control (MAC) addresses via the private access network 166.

The access line card 202 can include logic or instructions configured to direct data packets from the external interface(s) 208, 210 to the first plurality of access ports 214 and from the first plurality of access ports 214 to the first plurality of trunk ports 218, 220. The access line card 202 can also include logic or instructions configured to direct data packets from the second plurality of trunk ports 222, 224 to the second plurality of access ports 216 and from the second plurality of access ports 216 to the external interface(s) 208, 210. The logic or instructions can be included, for example, in one or more hardware or software modules, such as a routing logic module 212 within the memory device 206.

In a particular embodiment, the routing logic module 212 can be configured to control whether data packets are received or sent via each of the external interface(s) 208,210 of the access line card 202. For example, the routing logic module 212 can be configured to issue alternating commands or signals to the processor 204 to receive data packets from the DSLAMs 114, 120 via the external interface 1 208 and to send data packets to the DSLAMs 114, 120 via the external interface 1. Alternatively, the routing logic module 212 can be configured to issue commands or signals to the processor 204 to receive data packets via the external interface 1 during a first transmission cycle or interval 208 and to send data packets via the external interface 1 during a second transmission cycle or interval.

In an illustrative embodiment, the routing logic module 212 can be configured to issue commands or signals to the processor 204, such that it receives data packets via external interface 1 208, for example, while it sends data packets via external interface N 210. In another embodiment, the external interfaces 208, 210 can be dedicated input or output interfaces, and the routing logic module 212 can be configured to instruct the processor to receive data packets at each input external interface, such as external interface 1 208 on a sequential basis, and to send data packets on each output external interface, such as external interface N 210 on a sequential basis or according to other logic described herein.

Additionally, the routing logic module 212 can be configured to instruct the processor 204 to communicate data packets with designated DSLAMs, such as the DSLAM 1 114 via the external interface 1 208 and with alternate DSLAMs, such as DSLAM X 120 via the external interface N 210. Alternatively, the routing logic module 212 can be configured to instruct the processor 204 to receive and transmit data packets via the external interfaces 208, 210 on a first available basis.

In a particular embodiment, the routing logic module 212 can be configured to direct a data packet received at one of the external interfaces 208, 210 to an ingress access port, such as one of the first plurality of access ports 214. The routing logic module 212 can direct the data packet to one of the first plurality of access ports 214, for instance, on a first available basis, such that a next available ingress access port receives the data packet. Additionally, the routing logic module 212 can be configured to direct the data packet from the ingress access port to the first network line card 234 or the second network line card 236 via the first plurality of trunk ports 218, 220.

In an illustrative embodiment, the routing logic module 212 can contain logic or instructions to determine a destination Internet Protocol (IP) or Media Access Control (MAC) address of the data packet. The routing logic module 212 can determine which network line card 234, 236 communicates with a device having the destination IP or MAC address, for example, by referencing a table or information store that associates IP and MAC addresses of multiple devices with the network line cards 234, 236 of the aggregation switch 180. Alternatively, the table or information store can associate destination addresses with the trunk ports 218, 220, themselves, based on which network line card is coupled to each trunk port. Further, the routing logic module 212 can direct the data packet from the ingress access port to an egress trunk port that is coupled to the network line card associated with the destination IP or MAC address. For example, if the destination address of the data packet is a multicast server that communicates with the second network line card 236, the routing logic module 212 could direct the data packet to trunk port 1 218.

In a particular embodiment, the routing logic module 212 can be configured to control which of the first plurality of access ports 214 communicates with each of the first plurality of trunk ports 218, 220. In one embodiment, the routing logic module 212 can include instructions or logic to control communication between each of the first plurality of access ports 214 and each of the first plurality of trunk ports 218, 220, using a round-robin method. For example, the routing logic module 212 could contain instructions or logic to associate succeeding transmission intervals with each of the first plurality of access ports 214. During a first transmission interval, a data packet could be directed from access port Al to trunk port 1 218, if its destination address is associated with network line card 2 236. During a next transmission interval, a data packet can be directed from access port A2 to trunk port 2 220, if its destination address is associated with network line card 1 234. Each transmission interval can begin and end based on time periods; initiation and completion of data transmission; any other suitable method of determining a transmission interval; or any combination thereof.

Alternatively, the routing logic module 212 may be configured to monitor the first plurality of trunk ports 218, 220 for availability. When a trunk port becomes available, the routing logic module 212 can identify the next ingress access port having a data packet with a destination address corresponding to the network line card that communicates with the available trunk port. The routing logic module 212 can then direct the data packet from the identified access port to the available trunk port.

In a particular embodiment, the routing logic module 212 can be configured to direct a data packet received at one of the second plurality of trunk ports 222, 224 to an egress access port, such as one of the second plurality of access ports 216. The routing logic module 212 can direct the data packet to one of the first plurality of access ports 214, for instance, on a first available basis, such that a next available egress access port receives the data packet. Additionally, the routing logic module 212 can be configured to direct the data packet from the egress access port to one of the DSLAMs 114, 120 via one of the external interfaces 208, 210.

In an illustrative embodiment, the routing logic module 212 can contain logic or instructions to determine a destination Internet Protocol (IP) or Media Access Control (MAC) address of the data packet. The routing logic module 212 can identify a device having the destination IP or MAC address by referencing a table or information store that associates IP and MAC addresses of multiple devices with the DSLAMs 114, 120 that communicate with the devices. Alternatively, the table or information store can associate destination addresses with the external interfaces 208, 210, themselves, based on which DSLAM is coupled to each external interface. The routing logic module 212 can direct the data packet from the egress access port to an external interface that is coupled to the DSLAM that communicates with the device having the destination IP or MAC address. For example, if the destination address of the data packet is a set-top box device that communicates with the DSLAM X 120, the routing logic module 212 could direct the processor 204 to send the data packet to the DSLAM X 120 via the external interface N 210.

In a particular embodiment, the routing logic module 212 can be configured to control which of the second plurality of access ports 216 communicates with each of the external interfaces 208, 210. In one embodiment, the routing logic module 212 can include instructions or logic to control communication between each of the second plurality of access ports 216 and each of the external interfaces 208, 210, using a round-robin method. For example, the routing logic module 212 could contain instructions or logic to associate succeeding transmission intervals to each of the first plurality of access ports 216. During a first transmission interval, a data packet could be directed from access port A9 to external interface 1 208, if its destination address is associated with a DSLAM communicating with external interface 1 208. During a next transmission interval, a data packet can be directed from access port A12 to external interface N 210, if its destination address is associated with a DSLAM communicating with external interface N 210.

Alternatively, the routing logic module 212 could be configured to monitor the external interfaces 208, 210 for availability. When an external interface becomes available, the routing logic module 212 can identify the next egress access port having a data packet with a destination address corresponding to a DSLAM that communicates with the available external interface. The routing logic module 212 can then direct the data packet from the identified access port to the available external interface.

Figure 3:
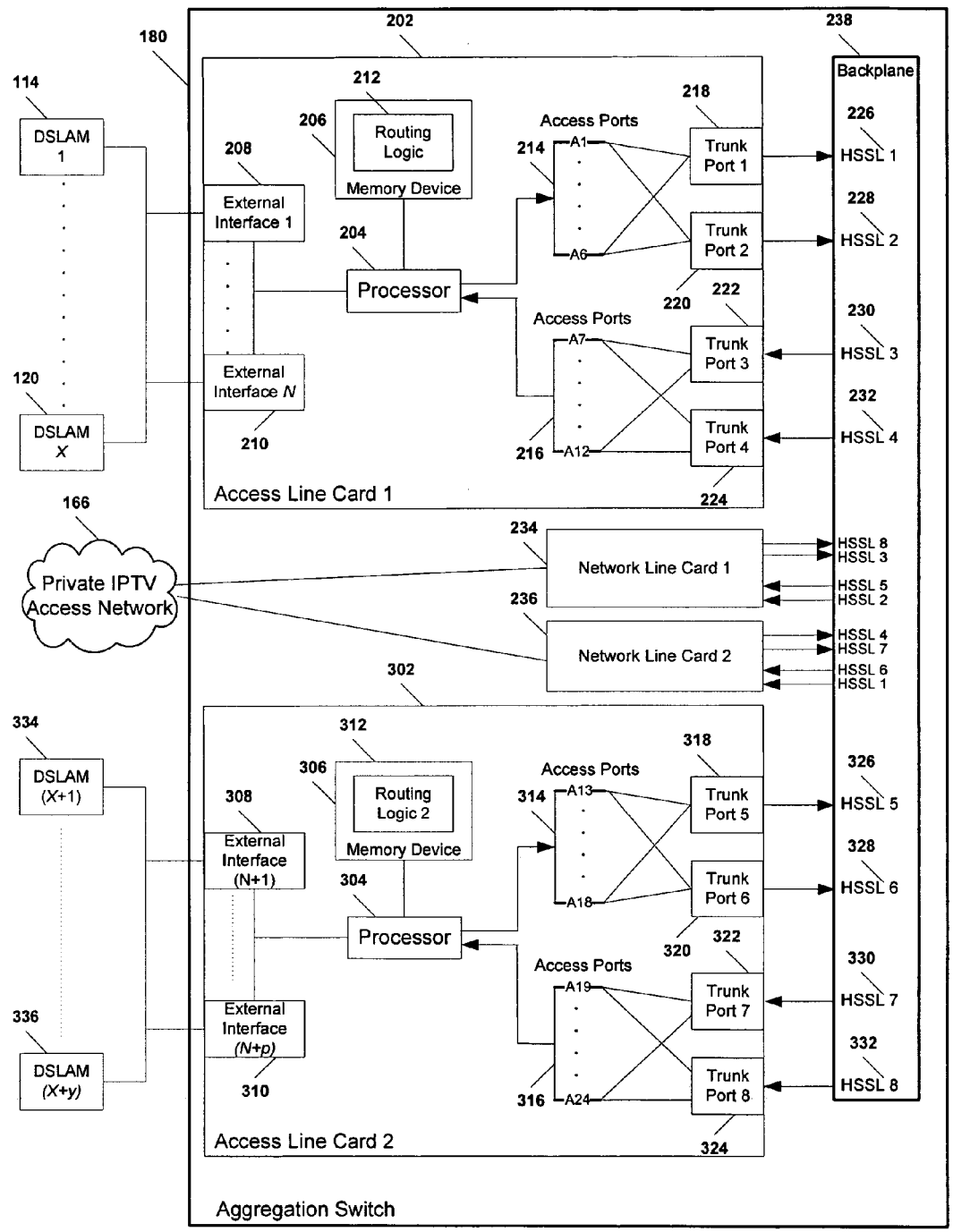
FIG. 3 is a block diagram illustrating a second embodiment of an aggregation switch.

Referring to FIG. 3, a second illustrative embodiment of a system to route data packets is illustrated and designated generally 300. In a particular embodiment, the system 300 includes the aggregation switch 180 illustrated in FIG. 1. The aggregation switch 180 can include a first access line card, such as the access line card 202 illustrated in FIG. 2. The first access line card 202 includes a first plurality of access ports 214 and a second plurality of access ports 216. Each of the first plurality of access ports 214 communicates with trunk ports 218, 220 and does not communicate with any other of the first plurality of access ports 214 or any of the second plurality of access ports 216. Each of the second plurality of access ports 216 communicates with trunk ports 222, 224 and does not communicate with any of the first plurality of access ports 214 or any other of the second plurality of access ports 216.

As illustrated in FIG. 2, each trunk port 218-224 is coupled to one or more network line cards 234, 236 via high-speed serial links 226-232. The high-speed serial links 226-232 can be coupled to the trunk ports 218-224 and the network line cards 234, 236, via a backplane 238 of the aggregation switch 180. In a particular embodiment, the network line cards 234, 236 can communicate with one or more devices of an IPTV system via a private access network, such as the private access network 166 illustrated in FIG. 1.

The first access line card 202 can include logic or instructions configured to direct data packets from the external interface(s) 208, 210 to the first plurality of access ports 214 and from the first plurality of access ports 214 to the first plurality of trunk ports 218, 220. The first access line card 202 can also include logic or instructions configured to direct data packets from the second plurality of trunk ports 222, 224 to the second plurality of access ports 216 and from the second plurality of access ports 216 to the external interface(s) 208, 210. The logic or instructions can be included, for example, in one or more hardware or software modules, such as a routing logic module 212 within the memory device 206.

In the embodiment illustrated in FIG. 3, the aggregation switch 180 also includes one or more additional access line cards, such as the second access line card 302. The second access line card 302 includes a processor 304 and a memory device 306 that is accessible to the processor 304. Additionally, the processor 304 is coupled to at least one external interface, such as external interface (N+1) 308 and external interface (N+p) 310. The processor 304 also communicates with a third plurality of access ports 314 and a fourth plurality of access ports 316. In an illustrative embodiment, the third plurality of access ports 314 and fourth plurality of access ports 316 can be virtual ports within the processor 304 or the memory device 306.

The third plurality of access ports 314 communicates with a third plurality of trunk ports, such as trunk port 5 318 and trunk port 6 320. Each of the third plurality of access ports 314 communicates with trunk ports 318, 320 and does not communicate with any other of the third plurality of access ports 314 or any of the fourth plurality of access ports 316. Additionally, the fourth plurality of access ports 316 communicates a fourth plurality of trunk ports, such as trunk port 7 322 and trunk port 8 324. Each of the fourth plurality of access ports 316 communicates with trunk ports 322, 324 and does not communicate with any of the third plurality of access ports 314 or any other of the fourth plurality of access ports 316.

As illustrated in FIG. 3, each trunk port 318-324 is coupled to the network line cards 234, 236 via a high-speed serial link. For example, trunk port 5 318 can be coupled to the first network line card 234 via a fifth high-speed serial link (HSSL 5) 326. Trunk port 6 320 can be coupled to the second network line card 236 via a sixth high-speed serial link (HSSL 6) 328. Additionally, trunk port 7 322 can be coupled to the second network line card 236 via a seventh high-speed serial link (HSSL 7) 330. Further, trunk port 8 324 can be coupled to the first network line card 234 via an eighth high-speed serial link (HSSL 8) 332. The high-speed serial links 326-232 can be coupled to the trunk ports 318-324 and the network line cards 234, 236, via a backplane 238 of the aggregation switch 180.

In a particular embodiment, the external interface(s) 308, 310 of the second access line card 302 can communicate with one or more digital subscriber line access multiplexers, such as the DSLAM (X+1) 334 through DSLAM (X+y) 336. The DSLAMs 334, 336 can communicate with Internet Protocol Television (IPTV) subscriber equipment via one or more residential gateways. For example, the first access line card 302 can send data packets that include video content data to IPTV subscriber set-top box devices via the DSLAMs 334, 336, and can receive data packets corresponding to commands or requests from the IPTV subscriber set-top box devices via the DSLAMs 334, 336.

The first access line card 302 can include logic or instructions configured to direct data packets from the external interface(s) 308, 310 to the third plurality of access ports 314 and from the third plurality of access ports 314 to the third plurality of trunk ports 318, 320. The first access line card 302 can also include logic or instructions configured to direct data packets from the fourth plurality of trunk ports 322, 324 to the fourth plurality of access ports 316 and from the fourth plurality of access ports 316 to the external interface(s) 308,310. The logic or instructions can be included, for example, in one or more hardware or software modules, such as a second routing logic module 312 within the memory device 306.

In a particular embodiment, the second routing logic module 312 can be configured to control whether data packets are received or sent via each of the external interface(s) 308, 310 of the first access line card 302. For example, the second routing logic module 312 can be configured to issue alternating commands or signals to the processor 304 to receive data packets from the DSLAMs 334, 336 via the external interface (N+1) 308 and to send data packets to the DSLAMs 334, 336 via the external interface (N+1) 308. Alternatively, the second routing logic module 312 can be configured to issue commands or signals to the processor 304 to receive data packets via the external interface (N+1) 308 during a first transmission cycle or interval 308 and to send data packets via the external interface (N+1) 308 during a second transmission cycle or interval.

In an illustrative embodiment, the second routing logic module 312 can be configured to issue commands or signals to the processor 304, such that it receives data packets via external interface (N+1) 308, for example, while it sends data packets via external interface (N+p) 310. In another embodiment, the external interfaces 308, 310 can be dedicated input or output interfaces, and the second routing logic module 312 can be configured to instruct the processor to receive data packets at each input external interface, such as external interface (N+1) 308 on a sequential basis, and to send data packets on each output external interface, such as external interface (N+p) 310 on a sequential basis or according to other logic described herein.

Additionally, the second routing logic module 312 can be configured to instruct the processor 304 to communicate data packets with designated DSLAMs 334, 336 via the external interface (N+1) 308 and with alternate DSLAMs 334, 336 via the external interface (N+p) 310. Alternatively, the second routing logic module 312 can be configured to instruct the processor 304 to receive and transmit data packets via the external interfaces 308, 310 on a first available basis.

In a particular embodiment, the second routing logic module 312 can be configured to direct a data packet received at one of the external interfaces 308, 310 to an ingress access port, such as one of the third plurality of access ports 314. The second routing logic module 312 can direct the data packet to one of the third plurality of access ports 314, for instance, on a first available basis, such that a next available ingress access port receives the data packet. Additionally, the second routing logic module 312 can be configured to direct the data packet from the ingress access port to the first network line card 334 or the second network line card 336 via the third plurality of trunk ports 318, 320.

In an illustrative embodiment, the second routing logic module 312 can contain logic or instructions to determine a destination Internet Protocol (IP) or Media Access Control (MAC) address of the data packet. The second routing logic module 312 can determine which network line card 334, 336 communicates with a device having the destination IP or MAC address, for example, by referencing a table or information store that associates IP and MAC addresses of multiple devices with the network line cards 234, 236 of the aggregation switch 180. Alternatively, the table or information store can associate destination addresses with the trunk ports 318, 320, themselves, based on which network line card is coupled to each trunk port. Further, the second routing logic module 312 can direct the data packet from the ingress access port to an egress trunk port that is coupled to the network line card associated with the destination IP or MAC address. For example, if the destination address of the data packet is a multicast server that communicates with the second network line card 236, the second routing logic module 312 could direct the data packet to trunk port 6 320.

In a particular embodiment, the second routing logic module 312 can be configured to control which of the third plurality of access ports 314 communicates with each of the third plurality of trunk ports 318, 320. In one embodiment, the second routing logic module 312 can include instructions or logic to control communication between each of the third plurality of access ports 314 and each of the third plurality of trunk ports 318, 320, using a round-robin method. Alternatively, the second routing logic module 312 could be configured to monitor the third plurality of trunk ports 318, 320 for availability.

In a particular embodiment, the second routing logic module 312 can be configured to direct a data packet received at one of the fourth plurality of trunk ports 322, 324 to an egress access port, such as one of the fourth plurality of access ports 316. The second routing logic module 312 can direct the data packet to one of the third plurality of access ports 314, for instance, on a first available basis. Additionally, the second routing logic module 312 can be configured to direct the data packet from the egress access port to one of the DSLAMs 334, 336 via one of the external interfaces 308, 310.

In an illustrative embodiment, the second routing logic module 312 can contain logic or instructions to determine a destination Internet Protocol (IP) or Media Access Control (MAC) address of the data packet. The second routing logic module 312 can identify a device having the destination IP or MAC address by referencing a table or information store that associates IP and MAC addresses of multiple devices with the DSLAMs 334, 336 that communicate with the devices. Alternatively, the table or information store can associate destination addresses with the external interfaces 308, 310, themselves, based on which DSLAM is coupled to each external interface. The second routing logic module 312 can direct the data packet from the egress access port to an external interface that is coupled to the DSLAM that communicates with the device having the destination IP or MAC address. For example, if the destination address of the data packet is a set-top box device that communicates with the DSLAM (X+1) 334, the second routing logic module 312 could direct the processor 304 to send the data packet to the DSLAM (X+1) 334 via the external interface (N+1) 308.

In a particular embodiment, the second routing logic module 312 can be configured to control which of the fourth plurality of access ports 316 communicates with each of the external interfaces 308, 310. In one embodiment, the second routing logic module 312 can include instructions or logic to control communication between each of the fourth plurality of access ports 316 and each of the external interfaces 308, 310, using a round-robin method. Alternatively, the second routing logic module 312 could be configured to monitor the external interfaces 308, 310 for availability.

Figure 4:
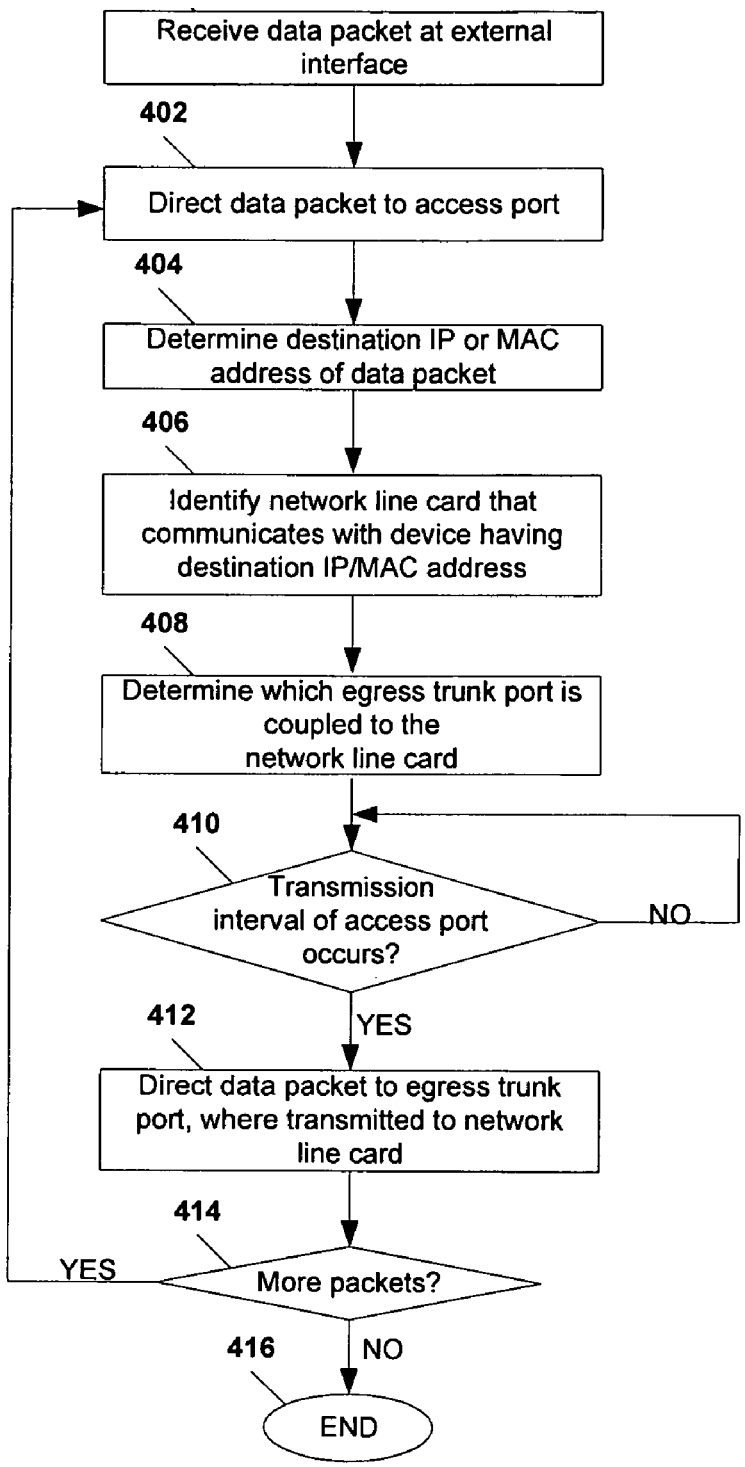
FIG. 4 is a flowchart diagram illustrating an embodiment of a method of routing data packets.

Referring to FIG. 4, an embodiment of a method of routing data packets is illustrated. At block 400, a data packet is received at an external interface of an access line card within an aggregation switch, such as an Internet Protocol (IP) data router. In one embodiment, the data packet can be received from a set-top box device via a digital subscriber line access multiplexer (DSLAM). Continuing to block 402, the data packet is directed to an ingress access port of the access line card according to routing logic executed at the access line card. Each ingress access line port within the access line card communicates with one or more egress trunk ports but does not communicate with any other access port. The terms 'ingress' and 'egress' are used to facilitate description and can be reversed or used in other combinations with reference to the access and trunk ports described herein.

Proceeding to block 404, a destination IP address or media access control (MAC) address of the data packet is determined. For example, the access line card can include logic or instructions to determine the destination address by inspecting a header or label of the data packet. Advancing to block 406, a network line card within the aggregation switch that communicates with a device having the destination IP or MAC address is identified. In an illustrative embodiment, the access line card can include logic or instructions to reference a lookup table or query an information store that associates network line cards with IP and MAC addresses. Continuing to block 408, an egress trunk port that is coupled to the identified network line card is determined. The access line card can determine the egress trunk port using tables or other logic or instructions that associate each egress trunk port with a network line card.

In a particular embodiment, at decision step 410, it is determined whether a transmission interval corresponding to the ingress access port with which the data packet is associated has occurred. For example, the access line card can contain instructions or logic to associate succeeding transmission intervals with each ingress access port. During a first transmission interval, a data packet could be directed from a first ingress access port to the egress trunk port, if its destination address is associated with the identified network line card. During a next transmission interval, a data packet can be directed from a second ingress access port to the egress trunk port, if its destination address is associated with the identified network line card. Each transmission interval can begin and end based on time periods; initiation and completion of data transmission; any other suitable method of determining a transmission interval; or any combination thereof. When a transmission interval corresponding to the ingress access port associated with the data packet occurs, the method proceeds to block 412, and the data packet is directed to the determined egress trunk port, where it is transmitted to the identified network line card via a high-speed serial link.

Moving to decision step 414, it is determined whether another data packet is received at the external interface of the access line card. If another data packet is received, the method returns to block 402. Conversely, if another data packet is not received, the method terminates at 416.

Figure 5:
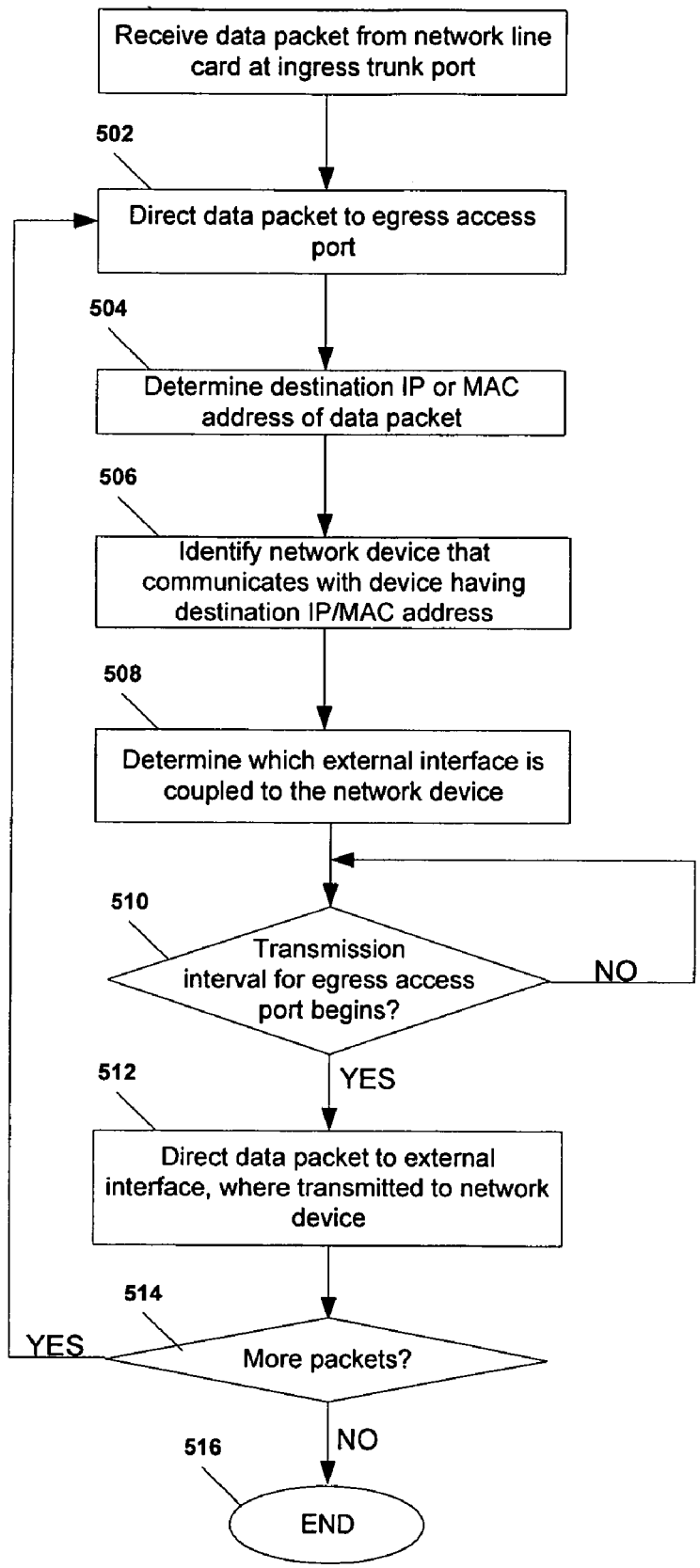
FIG. 5 is a flowchart diagram illustrating a second embodiment of a method of routing data packets.

Referring to FIG. 5, a second embodiment of a method of routing data packets is illustrated. At block 500, a data packet is received at an ingress trunk port of an access line card within an aggregation switch, from a network line card within the aggregation switch. In a particular embodiment, the data packet can be received via a high-speed serial link that connects the network line card with the ingress trunk port. Continuing to block 502, the data packet is directed from the ingress trunk port to an egress access port of the access line card according to routing logic executed at the access line card.

Proceeding to block 504, a destination IP address or media access control (MAC) address of the data packet is determined. For example, the access line card can include logic or instructions to determine the destination address by inspecting a header or label of the data packet. Advancing to block 506, a network device, such as a digital subscriber line access multiplexer (DSLAM) that communicates with a device, such as a set-top box device, having the destination IP or MAC address is identified. In an illustrative embodiment, the access line card can include logic or instructions to reference a lookup table or query an information store that associates DSLAMs with IP and MAC addresses or with residential gateways that communicate with devices having designated IP or MAC addresses. Continuing to block 508, an external interface that is coupled to the identified network device is determined. The access line card can determine the external interface using tables or other logic or instructions that associate each external interface with one or more network devices.

In a particular embodiment, at decision step 510, it is determined whether a transmission interval corresponding to the egress access port with which the data packet is associated has occurred. For example, the access line card can contain instructions or logic to associate succeeding transmission intervals with each egress access port. During a first transmission interval, a data packet could be directed from a first egress access port to the external interface, if its destination address is associated with the identified network device. During a next transmission interval, a data packet can be directed from a second egress access port to the external interface, if its destination address is associated with the identified network device. When a transmission interval corresponding to the egress access port associated with the data packet occurs, the method proceeds to block 512, and the data packet is directed to the determined external interface, where it is transmitted to the identified network device.

Moving to decision step 514, it is determined whether another data packet is received at the trunk port of the access line card. If another data packet is received, the method returns to block 502. Conversely, if another data packet is not received, the method terminates at 516.

Figure 6:
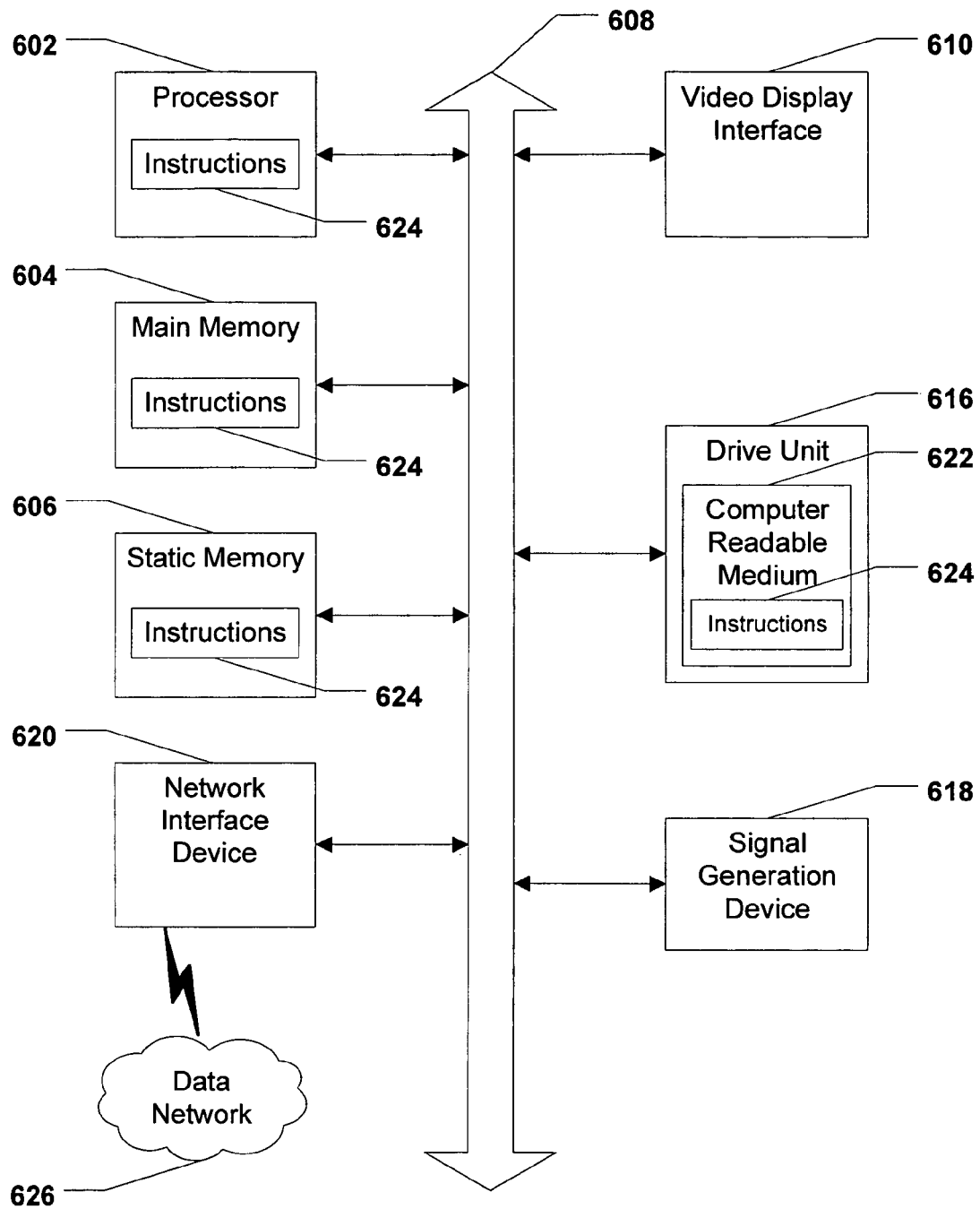
FIG. 6 is a diagram of an illustrative embodiment of a general computer system.

Referring to FIG. 6, an illustrative embodiment of a general computer system is shown and is designated 600. The computer system 600 can include a set of instructions that can be executed to cause the computer system 600, or a portion thereof, to perform any one or more of the methods or computer based functions disclosed herein in connection with a line card or with a network device. The computer system 600, or any portion thereof, may operate as a standalone device or may be a hardware or software module within a server, switch, line card, or set-top box device, as illustrated in FIGS. 1-3.

In a networked deployment, the computer system may operate in the capacity of an IPTV switch, data router, or a component thereof, such as an access line card or network line card. The computer system 600 can also be implemented as or incorporated into various other devices, or any other machine capable of executing a set of instructions (sequential or otherwise) that specify actions to be taken by that machine. In a particular embodiment, the computer system 600 can be implemented using electronic devices that provide audio, video or data communication. Further, while a single computer system 600 is illustrated, the term "system" shall also be taken to include any collection of systems or sub-systems that individually or jointly execute a set, or multiple sets, of instructions to perform one or more computer functions, such as the IPTV system illustrated in FIG. 1.

As illustrated in FIG. 6, the computer system 600 may include a processor 602, e.g., a central processing unit (CPU), a graphics-processing unit (GPU), or both. Moreover, the computer system 600 can include a main memory 604 and a static memory 606 that can communicate with each other via a bus 608. As shown, the computer system 600 may further include a video display unit 610, such as a liquid crystal display (LCD), an organic light emitting diode (OLED), a flat panel display, a solid state display, or a cathode ray tube (CRT). The computer system 600 can also include a disk drive unit 616, a signal generation device 618, such as a speaker, and a network interface device 620, such as an external interface or trunk port.

In a particular embodiment, as depicted in FIG. 6, the disk drive unit 616 may include a computer-readable medium 622 in which one or more sets of instructions 624, e.g. software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 624 or receives and executes instructions 624 responsive to a propagated signal, so that a device connected to a network 626 can communicate audio, video or data over the network 626. Further, the instructions 624 may be transmitted or received over the network 626 via the network interface device 620.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In conjunction with the configuration of structure described herein, the system and method disclosed provide a novel switching architecture. The system and method can provide advantages over other switching architectures, by reducing hardware and other requirements. In a particular embodiment, the system and method can significantly lower the network platform cost within a fiber-to-the-neighborhood (FTTN) or fiber-to-the-curb (FTTC) based IPTV system. In a particular deployment of a particular embodiment, the system and method disclosed may greatly reduce the number of connections between the access cards and the network line cards within each aggregation switch. The number of serial links using the high-speed serial ink architecture disclosed herein may be described as $2*(M-2)+2*(M-2)$, where M is the total number of access cards and network line cards in the switch. In a full mesh switch, the total number of connections is $M*(M-1)$. For example, if there are 14 access line cards and 2 network line cards in the switch, the switch as described would need only 56 serial links, where a full mesh switch would need 240 serial links.

Additionally, output queuing and corresponding buffer memory requirements are reduced or eliminated, because the congestion associated with full-mesh complex switching fabrics is also reduced or eliminated by use of a limited number of serial links. Further, use of the system and method may reduce or eliminate backpressure between switch fabric and the line cards within an aggregation switch. Moreover, because access ports do not communicate with each other, less bandwidth is wasted, and there is little or no need for additional software or hardware to prevent crosstalk between subscriber devices.

Although the present disclosure describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of routing data packets of an Internet Protocol Television (IPTV) system, the method comprising:
   receiving a first Internet Protocol (IP) data packet at a first access port of an access line card within a data router;
   transmitting the first IP data packet from the first access port to a network line card within the data router, via a first trunk port of the access line card, wherein the first access port is coupled to the first trunk port and not coupled to at least one other access port;
   receiving a second IP data packet at a second trunk port of the access line card from the network line card; and
   transmitting the second IP data packet from the second trunk port to a second access port of the access line card.

2. The method of claim 1, further comprising identifying a destination address of the first IP data packet.

3. The method of claim 2, further comprising routing the first IP data packet to the first trunk port based at least partially on the destination address.

4. The method of claim 3, wherein the first trunk port is coupled to the network line card to communicate the first IP data packet to a device having the destination address.

5. The method of claim 3, further comprising routing the first IP data packet to the network line card when the destination address is a first destination address and routing the IP data packet to another network line card when the destination address is another destination address.

6. The method of claim 1, further comprising routing the first data packet from an external interface of the access line card to the first access port.

7. The method of claim 1, further comprising allowing the first access port to communicate the first IP data packet to the first trunk port during a first transmission interval.

8. The method of claim 1, further comprising allowing the second access port to communicate the second IP data packet to an external interface of the access line card during a second transmission interval.

9. An access line card within a data router, the access line card comprising:
   a first plurality of access ports;
   a second plurality of access ports;
   a first plurality of trunk ports;
   a second plurality of trunk ports;
   wherein each of the first plurality of access ports is configured to communicate with the first plurality of trunk ports, but not to communicate with any other of the first plurality of access ports or with any of the second plurality of access ports;
   wherein each of the second plurality of access ports is configured to communicate with the second plurality of trunk ports, but not to communicate with any other of the second plurality of access ports or with any of the first plurality of access ports; and
   wherein the first plurality of trunk ports and the second plurality of trunk ports are configured to communicate with at least one network line card.

10. The access line card of claim 9, wherein the first plurality of trunk ports comprises a plurality of egress trunk ports configured to receive data packets from each of the first plurality of access ports and to communicate the data packets to the at least one network line card.

11. The access line card of claim 10, wherein the first plurality of access ports comprises a plurality of ingress access ports, each of the plurality of ingress access ports configured to receive the data packets from at least one network device via at least one first external interface and to transmit the data packets to at least one of the plurality of egress trunk ports.

12. The access line card of claim 9, wherein the second plurality of trunk ports comprises a plurality of ingress trunk ports configured to receive data packets from the at least one network line card and to communicate the data packets to each of the second plurality of access ports.

13. The access line card of claim 12, wherein the second plurality of access ports comprises a plurality of egress access ports, each of the plurality of egress access ports configured to receive the data packets from the plurality of ingress trunk ports and to transmit the data packets to the at least one network device via at least one second external interface.

14. The access line card of claim 9, wherein the first plurality of trunk ports comprises a first pair of trunk ports and the second plurality of trunk ports comprises a second pair of trunk ports.

15. The access line card of claim 14, wherein one of the first pair of trunk ports and one of the second pair of trunk ports are configured to communicate with a first network line card, and another of the first pair of trunk ports and another of the second pair of trunk ports are configured to communicate with a second network line card.

16. The access line card of claim 9, further comprising routing logic configured to selectively direct data transmission from each of the first plurality of access ports to each of the first plurality of trunk ports and from each of the second plurality of trunk ports to each of the second plurality of access ports.

17. The access line card of claim 16, wherein the routing logic directs data transmission according to a round robin process.

18. The access line card of claim 9, wherein at least one of the first plurality of trunk ports and at least one of the second plurality of trunk ports are coupled to the at least one network line card via high-speed serial links.

19. The access line card of claim 9, wherein the first plurality of trunk ports, the second plurality of trunk ports, or any combination thereof, is configured to operate as a single logical trunk port.

20. A method of sending and receiving data packets of an Internet Protocol Television (IPTV) system, the method comprising:
transmitting a first Internet Protocol (IP) data packet to an access line card of an IP data router;
wherein a first access port of the access line card communicates the first IP data packet to a network line card within the IP data router, via a first trunk port of the access line card, the first access port coupled to the first trunk port but not coupled to at least one other access port; and
receiving a second IP data packet from the access line card.

21. The method of claim 20, wherein the IP data router comprises a layer two router.

22. The method of claim 20, wherein the IP data router comprises a multicast-enabled router.

23. A data router, comprising:
a first access line card having:
a first plurality of access ports, a second plurality of access ports, a first plurality of trunk ports, and a second plurality of trunk ports;
wherein each of the first plurality of access ports is configured to communicate with the first plurality of trunk ports, but not to communicate with any other of the first plurality of access ports or with any of the second plurality of access ports;
wherein each of the second plurality of access ports is configured to communicate with the second plurality of trunk ports, but not to communicate with any other of the second plurality of access ports or with any of the first plurality of access ports; and
wherein the first plurality of trunk ports and the second plurality of trunk ports are configured to communicate with at least one network line card; and
a second access line card having:
a third plurality of access ports, a fourth plurality of access ports, a third plurality of trunk ports, and a fourth plurality of trunk ports;
wherein each of the third plurality of access ports is configured to communicate with the third plurality of trunk ports, but not to communicate with any other of the third plurality of access ports or with any of the fourth plurality of access ports;
wherein each of the fourth plurality of access ports is configured to communicate with the fourth plurality of trunk ports, but not to communicate with any other of the fourth plurality of access ports or with any of the third plurality of access ports; and
wherein the third plurality of trunk ports and the fourth plurality of trunk ports are configured to communicate with the at least one network line card.

24. The data router of claim 23, wherein the first access line card and the second access line card communicate with the at least one network line card via high-speed serial links within a backplane of the data router.

25. An access line card within a data router, the access line card comprising:
a first plurality of access ports;
a second plurality of access ports;
a first trunk port;
a second trunk port;
wherein each of the first plurality of access ports is configured to communicate with the first trunk port, but not to communicate with any other of the first plurality of access ports or with any of the second plurality of access ports;
wherein each of the second plurality of access ports is configured to communicate with the second trunk port, but not to communicate with any other of the second plurality of access ports or with any of the first plurality of access ports; and
wherein the first trunk port and the second trunk port are configured to communicate with a network line card.

26. The access line card of claim 25, wherein the data router is an Internet Protocol (IP) data router.

27. A non-transitory computer-readable storage medium, comprising instructions operable, when executed by a processor, to:
route a first Internet Protocol (IP) data packet received at one of a plurality of first access ports of an access line card of an IP data router, to a network line card within the IP data router, via one of a plurality of first trunk ports of the access line card, wherein each of the plurality of first access ports is configured to communicate with each of the plurality of first trunk ports and to not communicate with any other access port; and route a second IP data packet received at one of a plurality of second trunk ports of the access line card, from the network line card, to one of a plurality of second access ports of the access line card.

28. The non-transitory computer-readable storage medium of claim 27, wherein each of the plurality of second access ports is configured to communicate with each of the plurality of second trunk ports and to not communicate with any of the plurality of first access ports.

* * * * *